July 15, 1958     D. LABINO     2,843,461
METHOD OF PRODUCING SILICA FIBER
Filed Feb. 11, 1954
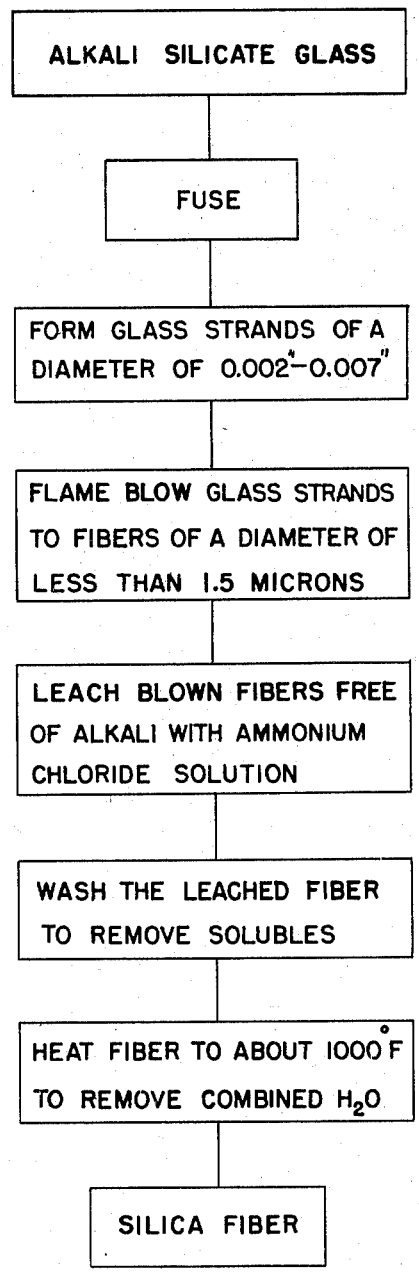
INVENTOR.
DOMINICK LABINO
BY Toulmin & Toulmin
ATTORNEYS

United States Patent Office 2,843,461
Patented July 15, 1958

2,843,461
METHOD OF PRODUCING SILICA FIBER

Dominick Labino, Toledo, Ohio, assignor, by mesne assignments, to L. O. F. Glass Fibers Company, Toledo, Ohio, a corporation of Ohio Application February 11, 1954, Serial No. 409,590

10 Claims. (Cl. 41—42)

This invention relates to a method of producing silica fibers and fibers comprised of silica and chemically combined water which latter may be termed silicic acid fibers.

In my co-pending application, Serial No. 304,150, filed August 13, 1952, and my co-pending application, Serial No. 353,348, filed May 6, 1953, both now abandoned, I have disclosed methods of producing fibers of substantially pure silica. In the processes of those co-pending applications relatively strong acids have been employed to effect the leaching of alkali from an alkali silicate, or water has been employed as the leaching agent over an extended period of time, the time in each instance being shortened considerably by the use of leaching agents at elevated temperatures.

I have now discovered that satisfactory silica fibers may be produced from fibers of alkali silicates by effecting leaching of the latter with a solution of ammonium chloride. Ammonia is freed by the reaction of the chloride with the silicate and soluble salts are formed, the nature of which salts depends upon the particular alkali silicate, and the salt may be, for example, sodium chloride, potassium chloride, a mixture thereof or lithium chloride.

In the process the ammonia is recoverable and the salt formed may if desired be employed as noted hereinafter to produce an alkali carbonate which latter compound is useful due to its high purity as a constituent in glass formation.

The immediate product of the leaching of the alkali silicate fibers with the ammonium chloride as in other processes is a fiber consisting essentially of silica and chemically combined water—that is a silicic acid fiber from which the water may be driven at about 1000° F. to provide pure silica fibers having a softening point equivalent to that of pure silica—between about 2900–3000° F.

The utilization of ammonium chloride is limited to alkali silicate fibers having a diameter of not greater than about 1.5 microns; most suitably the fibers have a diameter in the range of 0.1 to 1 micron, and a mass of fibers having their diameters in such range is readily leachable with the chloride. The larger size fibers, regardless of the ratio of the alkali to silicate, tend to lack strength and the leaching of a mass thereof produces mushiness, probably due to the tendency of the alkali silicate to form gels. However, if the fiber diameter is maintained low no gelling effect occurs and the fibers exhibit sufficient strength to permit them to be readily formed into an all-silica paper without the utilization of binders. Such paper is of considerable importance in high temperature insulation applications.

The ratio of silica to alkali is limited to about 4 mols of silica to 1 of alkali. A lesser proportion of silica is useful but the amount of material leached from the fiber is then proportionately greater and accordingly the silica skeleton ultimately produced is more porous and of less strength then the fiber produced from higher silica content alkali glasses. Further the longer time required for leaching and the higher the temperature and concentration of the agent employed for leaching contributes to the tendency to gel formation. Higher ratios of silica to alkali than about 4:1 are prohibited due principally to the tendency of the glasses of such constituents to devitrify while being drawn into filaments necessary for the production of the alkali-silicate fibers.

With the smaller diameter fibers of the alkali silicate the leaching is effected with the ammonium chloride at room temperature and at relatively low concentrations; I prefer to employ however temperatures approaching the boiling point and ammonium chloride concentration of about 4–20% by weight of the aqueous solution.

The ammonium chloride may suitably be added in considerable excess for it is a soluble salt readily washable from the fiber with the soluble chlorides formed and will not itself break down materially even at the boiling point; while at the boiling point the $NH_4Cl$ solution tends to become very slightly acid such hydrolysis occurs only to the extent of about 0.06% by weight of the salt the equilibrium lying far to the left in the equation $NH_4Cl \rightleftharpoons NH_3 + HCl$. In fact a feature of the use of the ammonium chloride as the leaching agent in addition to the freedom from necessity for use of corrosive acids and long leaching times with water, is the ability of the agent to indicate its own reaction end point, that is the evolution of ammonia gas ceases once the alkali of the silicate has completed reaction with the ammonium chloride, regardless of how much ammonium chloride may be in excess.

It is accordingly a primary feature of this invention to provide a novel method for the production of silica fibers from alkali silicates, which method avoids difficulties of other processes and which method provides a readily determinable end point.

The invention will be more fully described in connection with the accompanying flow sheet.

In the practice of the invention as indicated in the flow sheet an alkali silicate glass is fused and formed into glass filaments or strands preferably having a diameter in the range of 0.002 to 0.007 inch. For the purpose of the production of the filaments I prefer to employ the apparatus disclosed in my copending application, Serial No. 247,010, filed September 19, 1951, now abandoned, and assigned to the same assignee as the present invention.

I have found that such apparatus is capable of producing uniform diameter filaments more accurately and consistently than other commercial apparatus and accordingly prefer the same, as the blown fibers produced from the filaments are then also more uniform. However apparatus which is operable to produce filaments in the above noted range and varying not more than plus or minus 20% from any selected diameter in the range is eminently satisfactory.

A most useful alkali silicate glass for the inventive purpose consists of about 78.2 percent silica and 21.8 percent sodium oxide by weight. The silica-alkali ratio is then very nearly 4:1 and is not such as to give rise to undue problems with respect to attenuation or devitrification. Accordingly a glass of the specific composition noted above is in the practice of the invention fused, caused to exude through small apertures in a crucible and drawn into filaments having diameters in the noted range.

These glass filaments or strands are then passed through a hot high velocity gas blast having a temperature of about 3300–3500° F. and a velocity of about 1600–2000 feet per second, whereby the filaments are rendered molten and further attenuated to diameters in the range of about 0.01 to 1 micron. Filaments from the low end of the 0.002–0.007 inch range produce a majority of fibers in the lower end of the fiber range, while under the same conditions the larger size filaments produce larger diameter fibers with only a scattered few exceeding the noted 1 micron and substantially none of the fibers exceeding 1.5 microns. The blown fibers are suitably collected on a screen in a manner known to the art and are ready for subjection to alkali oxide removal with ammonium chloride.

In one embodiment of the process of the invention an aqueous solution containing about 6% by weight of ammonium chloride is placed in a beaker and brought to boiling—the presence of ammonia gas is not readily detectable at this time, but upon placing a loose mass of the alkali-silica fibers therein ammonia will immediately be given off and will continue to be detected until the alkali of the fiber has been converted to salts if the ammonium chloride is present in excess. To attain the excess of ammonium chloride it is only necessary that more than 2 mols of ammonium chloride be present for each mol of alkali oxide; this insures complete conversion of the alkali to salt, the reaction going to completion since the ammonia gas is given off.

The formula for the reaction which takes place is:

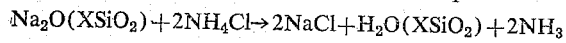

$$Na_2O(XSiO_2) + 2NH_4Cl \rightarrow 2NaCl + H_2O(XSiO_2) + 2NH_3$$

In the above example the solution of ammonium chloride is maintained at boiling during the evolution of the ammonia gas and as soon as such evolution has ceased the fibers should be withdrawn from the water and washed. If sensitive devices, other for example than sense of smell, are employed to detect the end point the addition to the $NH_4Cl$ solution of about 1% by weight of an acid having compact anions such as $H_2PtCl_6$ will prevent dissociation at the boiling and sharpen the endpoint; the added acid is removable with the water wash.

This washed product when dried will consist of silica and approximately 7–11% by weight of water. The fiber is heated to about 1000° F. or slightly thereabove to completely eliminate the water and a skeleton in silica fiber form remains.

The ammonia given off in the above noted reaction may, if desired, be collected, combined with carbon dioxide and water in a known manner to produce $NH_4HCO_3$, which is then reacted with brine to yield more $NA_4Cl$ and $NaHCO_3$; the latter is convertible by heat to $Na_2CO_3$ for further use in glass making. The $NH_4Cl$ is utilized in the leaching process of invention.

As noted hereinbefore the reaction of the ammonium chloride with the alkali silicate at the boiling temperature of the solution is surprisingly fast, evolution of gas and freeing of the alkali from the silicate taking place almost instantly. Such action is facilitated by using a relatively large volume of solution as the leached alkali is then reacted even more quickly.

In specific application 25 grams of the alkali silicate fiber placed in 1000 cc of a 6% solution of ammonium chloride at boiling temperature, the fiber diameter being in the range of 0.01 to 1.0 micron are leachable completely in a matter of 30 minutes to 1 hour, the gas evolution being a clear indication of the rapidity with which the alkali is freed from the fiber. Such time compares favorably with relatively strong acid solutions and corrosive effects of the latter are avoided.

At a temperature of about 180° F. the time of extraction is increased only slightly when using the chloride and the alkali is freeable from the fiber in less than about 2 hours.

At room temperature and under the same conditions set forth above 6–8 hours are required to effectively complete leaching the fibers.

The product of each leaching time and temperature set forth above is similar in all characteristics and is not deleteriously affected by heat in the removal of the water constituent of the silicic acid fiber, and is not affected by heat deleteriously up to the melting point of the silica.

Care must be exerted however to insure of complete removal of the oxide, for as much as 1–2% of $Na_2O$ remaining materially lowers the resistance of the fiber to heat, subjects the fiber to attack by moisture and deleteriously affects the electrical resistance properties of the fiber.

Potassium oxide, lithium oxide or a mixture of alkali oxides are useful in the alkali silicate glass and the same procedural methods are applicable thereto and similar results are attained. Also the silica-alkali ratio may be readily reduced to, for example, 2.5 or 3:1 without materially affecting the leaching time or temperature.

The process described is effective whether the fiber of less than 1.5 micron diameter is in loose mass form or present as a compacted mass. The times set forth hereinbefore relate particularly to the loose mass and are somewhat longer if the alkali silicate fibers are pressured tightly together prior to contact with the ammonium chloride. Preferably where a tight mass is employed the ammonium chloride is present at higher temperature and in the higher range of concentration, that is, up to about 20% by weight of an aqueous solution—and the chloride solution is continuously percolated through the fiber mass. Also when the fibers are in compact form it is preferable to employ fibers of a diameter in the range of 0.1 to 1 micron and a mass of fibers having an average diameter of about 0.25 micron has been found most suitable for this purpose, the strength of such compact bat being greater than for bats averaging higher or lower in fiber diameter.

It will be understood that this invention is susceptible to modification in order to adopt it to different usages and conditions and accordingly, it is desired to comprehend such modifications within this invention as may fall within the scope of the appended claims.

I claim:

1. The process which comprises the step of subjecting alkali silicate fiber having a diameter of less than about 1.5 microns to the action of a solution of ammonium chloride to substantially completely free the fiber of alkali.

2. The process which comprises the step of immersing alkali silicate fiber having a diameter in the range of about 0.1 to 1 micron in a hot aqueous solution of ammonium chloride to substantially completely free the fiber of alkali.

3. The process which comprises the steps of immersing alkali silicate fibers having diameters of less than about 1.5 microns in an aqueous solution of ammonium chloride to evolve ammonia, retaining the fibers in contact with the solution until the evolution of ammonia ceases and the alkali is substantially completely extracted from the fiber, withdrawing the fibers from the solution, and washing and drying the fibers.

4. The process which comprises the steps of immersing alkali silicate fibers having a diameter of less than about 1.5 microns in an aqueous boiling solution of ammonium chloride containing a small percentage of an acid having compact anions to evolve ammonia, retaining the fibers in contact with the boiling solution until the evolution of ammonia ceases and the alkali is substantially completely extracted from the fiber, withdrawing the fibers from the solution, and washing and drying the fibers.

5. The process which comprises the step of subjecting alkali silicate fibers having a diameter of less than about 1.5 microns to a boiling aqueous solution of ammonium chloride containing about 1% of an acid having compact anions to substantially completely free the fibers of alkali.

6. The process which comprises the steps of immersing alkali silicate fibers having a diameter of less than about 1.5 microns in an aqueous boiling solution of ammonium chloride containing a small percentage of $H_2PtCl_6$ to evolve ammonia, retaining the fibers in contact with the boiling solution until the evolution of ammonia ceases and the alkali is substantially completely extracted from the fiber, withdrawing the fibers from the solution, and washing and drying the fibers.

7. A process of producing silica fibers which comprises immersing alkali silicate fibers having a diameter of less than about 1.5 microns in an aqueous solution of ammonium chloride to evolve ammonia, retaining the fibers in contact with the solution until the evolution of ammonia substantially ceases and the alkali is substantially completely extracted from the fiber, withdrawing the fibers from solution, washing the same, and heating the washed fibers to a temperature of about 1000° F. to produce silica fiber.

8. A process of producing silica fibers which comprises immersing alkali silicate fibers having a diameter of less than about 1.5 microns and a silica-alkali ratio of about 4:1 in an aqueous 5–20% by weight solution of ammonium chloride to evolve ammonia, retaining the fibers in contact with the solution until the evolution of ammonia substantially ceases and the alkali is substantially completely extracted from the fiber, withdrawing the fibers from solution, washing the same, heating the washed fibers to a temperature of above about 1000° F. to drive water out of combination with the fiber to thereby produce silica fiber.

9. The process which comprises the steps of percolating an aqueous solution of ammonium chloride through a compact bat of alkali silicate fibers having a fiber diameter in the approximate range of 0.1 to 1 micron to evolve ammonia, cutting off the solution flow when the evolution of ammonia has substantially ceased and the alkali is substantially completely free from the fiber, percolating water through the bat to wash the same, and drying the bat.

10. The process which comprises percolating an aqueous boiling solution of ammonium chloride containing about 1% of $H_2PtCl_6$ through a compact bat of alkali silicate fibers having an average diameter of 0.25 micron and with substantially none of the fibers above about 1 micron to evolve ammonia from the solution, cutting off the solution flow when the evolution of ammonia has substantially ceased and the alkali is substantially completely free from the fiber, percolating water through the bat to wash the same, and drying the bat.

References Cited in the file of this patent
UNITED STATES PATENTS

| | | |
|---|---|---|
| 2,315,259 | Hyde | Mar. 30, 1943 |
| 2,528,391 | Seddon | Oct. 31, 1950 |
| 2,635,390 | Parker | Apr. 21, 1953 |
| 2,658,848 | Labino | Nov. 10, 1953 |